US009268695B2

(12) United States Patent
Weiner et al.

(10) Patent No.: US 9,268,695 B2
(45) Date of Patent: Feb. 23, 2016

(54) METHODS AND STRUCTURE FOR USING REGION LOCKS TO DIVERT I/O REQUESTS IN A STORAGE CONTROLLER HAVING MULTIPLE PROCESSING STACKS

(71) Applicant: LSI Corporation, Milpitas, CA (US)

(72) Inventors: Adam Weiner, Henderson, NV (US); Robert L. Sheffield, Jr., Longmont, CO (US); Naveen Krishnamurthy, Bangalore (IN); Kapil Sundrani, Bareilly (IN); Rajeev Srinivasa Murthy, Bangalore (IN); Anand Narayanamurthy, Bangalore (IN); Horia Cristian Simionescu, Foster City, CA (US); James A. Rizzo, Austin, TX (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 404 days.

(21) Appl. No.: 13/711,885

(22) Filed: Dec. 12, 2012

(65) Prior Publication Data

US 2014/0164715 A1 Jun. 12, 2014

(51) Int. Cl.
*G06F 12/08* (2006.01)
*G06F 3/06* (2006.01)
*G06F 12/14* (2006.01)

(52) U.S. Cl.
CPC ............ *G06F 12/0815* (2013.01); *G06F 3/061* (2013.01); *G06F 3/0635* (2013.01); *G06F 3/0659* (2013.01); *G06F 3/0671* (2013.01); *G06F 12/14* (2013.01)

(58) Field of Classification Search
CPC . G06F 12/0808; G06F 9/3857; G06F 9/3806; G06F 9/3838; G06F 9/384; G06F 12/0815; G06F 12/14; G06F 13/14; G06F 3/0613; G06F 3/0619; G06F 3/0659; G06F 9/30054
USPC ................ 711/118, 120, 125, 143, 144, 150, 711/159.163, 165, 166
See application file for complete search history.

(56) References Cited

U.S. PATENT DOCUMENTS

| 5,285,528 | A  | 2/1994  | Hart |
| 5,761,659 | A  | 6/1998  | Bertoni |
| 6,032,216 | A  | 2/2000  | Schmuck et al. |
| 6,574,749 | B1 | 6/2003  | Parsons |
| 6,675,157 | B1 | 1/2004  | Mitchell |
| 7,082,390 | B2 | 7/2006  | Bergsten |
| 7,167,960 | B2 | 1/2007  | Kodama |
| 7,260,703 | B1 | 8/2007  | Moore et al. |
| 7,269,588 | B1 | 9/2007  | Verma et al. |
| 7,290,105 | B1 | 10/2007 | Jeter, Jr. et al. |

(Continued)

OTHER PUBLICATIONS

Brian Randell. 1985. Hardware/software tradeoffs: a general design principel?. SIGARCH Comput. Archit. News 13, 2 (Jun. 1985), 19-21.

*Primary Examiner* — Zhuo Li

(57) ABSTRACT

Methods and structure within a storage controller for using region locks to efficiently divert an I/O request received from an attached host system to one of multiple processing stacks in the controller. A region lock module within the controller allows each processing stack to request a region lock for a range of block addresses of the storage devices. A divert-type lock request may be established to identify a range of block addresses for which I/O requests should be diverted to a particular one of the multiple processing stacks.

13 Claims, 6 Drawing Sheets

(56) References Cited

U.S. PATENT DOCUMENTS

| | | |
|---|---|---|
| 7,305,537 B1 | 12/2007 | Moore et al. |
| 7,370,128 B2 | 5/2008 | Douglas |
| 7,386,692 B1 | 6/2008 | Moore et al. |
| 7,478,179 B2 | 1/2009 | Moore et al. |
| 7,562,200 B1 | 7/2009 | Chatterjee et al. |
| 7,627,744 B2 | 12/2009 | Maher et al. |
| 7,685,462 B1 | 3/2010 | Leong |
| 7,730,222 B2 | 6/2010 | Passerini |
| 7,734,616 B2 | 6/2010 | Mogi et al. |
| 7,774,569 B1 | 8/2010 | Chatterjee et al. |
| 7,827,362 B2 | 11/2010 | Passerini |
| 2003/0135783 A1 | 7/2003 | Martin et al. |
| 2003/0140209 A1 | 7/2003 | Testardi |
| 2003/0200398 A1 | 10/2003 | Harris |
| 2005/0220112 A1 | 10/2005 | Williams, Jr. et al. |
| 2005/0228924 A1 | 10/2005 | Marushak et al. |
| 2006/0047902 A1 | 3/2006 | Passerini |
| 2006/0095658 A1 | 5/2006 | Marushak et al. |
| 2007/0088928 A1* | 4/2007 | Thangaraj et al. ............ 711/163 |
| 2007/0136341 A1 | 6/2007 | Schopp |
| 2007/0233684 A1 | 10/2007 | Verma et al. |
| 2008/0024413 A1 | 1/2008 | Minami et al. |
| 2008/0181229 A1 | 7/2008 | Williams et al. |
| 2008/0244136 A1 | 10/2008 | Radulescu |
| 2009/0254774 A1* | 10/2009 | Chamdani et al. ................ 714/2 |
| 2010/0268904 A1* | 10/2010 | Sheffield et al. .............. 711/163 |
| 2012/0042101 A1 | 2/2012 | Young et al. |
| 2012/0089753 A1* | 4/2012 | Pelis et al. ...................... 710/39 |

* cited by examiner

METHODS AND STRUCTURE FOR USING REGION LOCKS TO DIVERT I/O REQUESTS IN A STORAGE CONTROLLER HAVING MULTIPLE PROCESSING STACKS

BACKGROUND

1. Field of the Invention

The invention relates generally to storage controllers and more specifically relates to methods and structure for using region lock structures to divert I/O requests to one of multiple I/O processing stacks of the storage controller.

2. Related Patents

This patent is related to the following commonly owned United States patents and/or patent applications (collectively referred to herein as the "Related Patents"):

U.S. patent application Ser. No. 12/760,415 entitled "APPARATUS AND METHODS FOR TREE MANAGEMENT ASSIST CIRCUIT IN A STORAGE SYSTEM" filed 14 Apr. 2010, U.S. patent application Ser. No. 12/760,434 entitled "APPARATUS AND METHODS FOR REGION LOCK MANAGEMENT ASSIST CIRCUIT IN A STORAGE SYSTEM" filed 14 Apr. 2010, and U.S. Pat. No. 7,529,902 entitled "METHODS AND SYSTEMS FOR LOCKING IN STORAGE CONTROLLERS" filed 19 Oct. 2005.

All of which are hereby incorporated by reference.

3. Discussion of Related Art

A storage controller is a device adapted to receive I/O requests from one or more host systems and to process such received requests to store or retrieve data on storage devices coupled with the storage controller. For example, a RAID (Redundant Array of Independent Drives) storage controller manages one or more logical volumes that each comprises portions of one or more physical storage devices. The RAID controller maps logical block addresses of the logical volumes to corresponding physical blocks of the storage devices and provides redundancy and/or striping of the data for enhanced reliability and/or performance (in accordance with redundancy and striping policies of a particular RAID storage management technique defined for the logical volume).

It is common for high performance storage controllers to utilize a cache memory to enhance performance of the storage controller in processing I/O requests. For example, data written to a logical volume by a host system may be stored in the storage controller's cache memory such that subsequent read I/O requests may be satisfied by retrieving the requested data from the cache memory far more rapidly than by retrieving the requested data from the storage devices that comprise the logical volume. Some storage controllers may manage the cache memory as a "write-through" cache in which data is written to both the cache memory and to the storage devices. Some controllers may manage the cache memory in a "write-back" mode in which data is written to the cache memory and only posted/flushed to the storage devices at some later time (e.g., when the storage controller is less busy processing I/O requests). In the write-back mode, there could be data (referred to as "dirty data") that resides in the cache memory but is not yet stored on the storage devices.

Some storage controllers (e.g., high-performance RAID storage controllers) provide for multiple processing pathways or stacks within the storage controller for processing I/O requests. For example, some storage controllers from LSI Corporation provides for a "fast path" processing circuit (e.g., a first processing pathway/stack) operable in conjunction with a firmware processing stack (e.g., a second/conventional processing pathway generally implemented as firmware instructions executed by a general or special purpose processor of the controller). The LSI Corporation fast path processing circuit works in conjunction with specialized drivers on the host systems to more rapidly process I/O requests formatted to allow the fast path circuit to rapidly process the request (e.g., the host system enhanced driver understands the RAID mapping and generates fast path requests to directly access the underlying physical storage devices thus allowing the fast path circuit to rapidly process the I/O request). The firmware processing pathway is adapted to process any type of I/O request received from any host system (e.g., for processing I/O requests regardless of its formatting as a fast path I/O request). The firmware stack handles more generalized processing using a general purpose processor executing instructions and providing full RAID mapping and management. Thus, though more flexible, the firmware processing stack processes I/O requests more slowly than does the fast path circuit.

In such storage controllers having multiple processing stacks (e.g., having a fast path circuit pathway and a firmware processing stack), some initial processing by the storage controller is necessary to determine which of the multiple processing stacks is appropriate for processing a particular I/O request. This initial processing can be a complex process depending on a number of factors. For example, if the storage controller utilizes its cache memory in a write-back mode, use of a fast path processing circuit may give rise to data integrity issues if there is dirty data presently in the cache memory of the storage controller that has not yet been flushed or posted to the storage devices. The fast path circuit may be optimally tuned in such a controller so that it is unaware of the contents of the cache memory and thus could write data to the storage devices that could later be overwritten if the dirty data is flushed. Or, the fast path circuit could read data from the storage devices that is not up to date because dirty data (more up to date data) is presently stored in the cache memory for the blocks accessed by the fast path circuit. Further, for example, if the firmware processing stack maintains a list of bad blocks to be avoided in storing or retrieving data from a logical volume or from particular storage devices, the fast path processing circuit may be unaware of the list of bad blocks and may again give rise to data integrity problems by attempting to access the potentially bad blocks. The fast path circuit may attempt to read or write data to such a bad block that only the firmware processing stack is aware may be bad. Other situations may arise where a firmware I/O request processing stack is presently engaged in certain optimizations such as coalescing smaller I/O requests to form full-stripe writes, optimization for streaming I/O requests, etc. These and other reasons may give rise to a preference for one I/O request processor of a storage controller over another despite an encoding of the request by the host to designate or prefer a particular processor.

Accounting for these various conditions in determining which of the multiple processing stacks is best suited for processing an I/O request can be a time-consuming, complex procedure. Thus, present techniques may simply disable the use of one of the multiple processing stacks (e.g., disable use of the fast path I/O processing circuit of LSI Corporation storage controllers) to avoid these and other potential problems if certain conditions may arise. For example, if any dirty data is presently stored in the write-back cache memory (regardless of whether a particular fast path I/O request may access that dirty data) or if any blocks are designated as "bad blocks" by the firmware processing stack (regardless of whether a particular fast path I/O request may access those bad blocks), the firmware processing stack disables the fast path processing circuit and chooses to process all I/O requests through its slower, but more generalized, processing pathway. In a conservative design approach, the LSI fast path I/O processing circuit may simply be disabled to avoid these and other problems arising by processing of an I/O request directed to the fast path circuit. Disabling use of the fast path I/O processing circuit may degrade performance of the storage controller.

Thus it is an ongoing challenge to effectively and efficiently determine which I/O processing stack is best suited for processing a particular I/O request and to divert a received I/O request to the preferred, selected I/O processing stack without risk of data integrity problems.

SUMMARY

The present invention solves the above and other problems, thereby advancing the state of the useful arts, by providing methods and structure within a storage controller for using region locks to efficiently divert an I/O request received from an attached host system to one of multiple processing stacks in the controller. A region lock module within the controller allows each processing stack to request a region lock for a range of block addresses of the storage devices. A divert-type lock request may be established to identify a range of block addresses for which I/O requests should be diverted to a particular one of the multiple processing stacks.

In one exemplary embodiment of a controller having a fast path circuit for processing fast path formatted I/O requests and a firmware processing stack for processing any form of I/O request, the firmware processing stack may request that the region lock module establish a divert-type region lock for a range of block addresses. The range of block addresses are associated with dirty data in cache and/or potential bad block addresses. When the fast path circuit attempts to lock a range of blocks to process an I/O request, a divert-type lock that covers any portion of the range of blocks for the I/O request will cause the I/O request to be diverted to the firmware processing stack.

In one aspect hereof, a storage controller is provided that is adapted to couple with one or more host systems and adapted to manage data on one or more storage devices coupled with the storage controller. The storage controller comprises a fast path circuit adapted to process an I/O request formatted for fast path processing received from an attached host system and a firmware processing stack operating on a processor of the controller, the firmware processing stack adapted to process any format of I/O request. The controller further comprises a region lock module coupled with the fast path circuit and coupled with the firmware processing stack. The region lock module is adapted to receive lock request signals to lock a specified range of block addresses and is further adapted to determine whether a received fast path formatted I/O request should be diverted to the firmware processing stack based on the status of presently locked ranges of block addresses. The storage controller is further adapted to divert the fast path formatted I/O request to the firmware processing stack for processing in response to determining that the fast path formatted I/O should be diverted to the firmware processing stack.

Other aspects hereof provide a computer readable medium embodying a method and the method itself. The method is operable in a storage controller adapted to couple with one or more host systems and adapted to couple with one or more storage devices. The storage controller has a fast path circuit for processing of fast path formatted I/O requests received from a host system and has a firmware processing stack for processing I/O requests of any format. The method comprises receiving a fast path formatted I/O request and determining, by operation of a region lock module of the controller, whether the received fast path formatted I/O should be diverted to the firmware processing stack based on the status of presently locked ranges of block addresses. The method then diverts the fast path formatted I/O request to the firmware processing stack for processing in response to the determination that the fast path formatted I/O request should be diverted to the firmware processing stack.

DETAILED DESCRIPTION OF THE DRAWINGS

Figure 1:
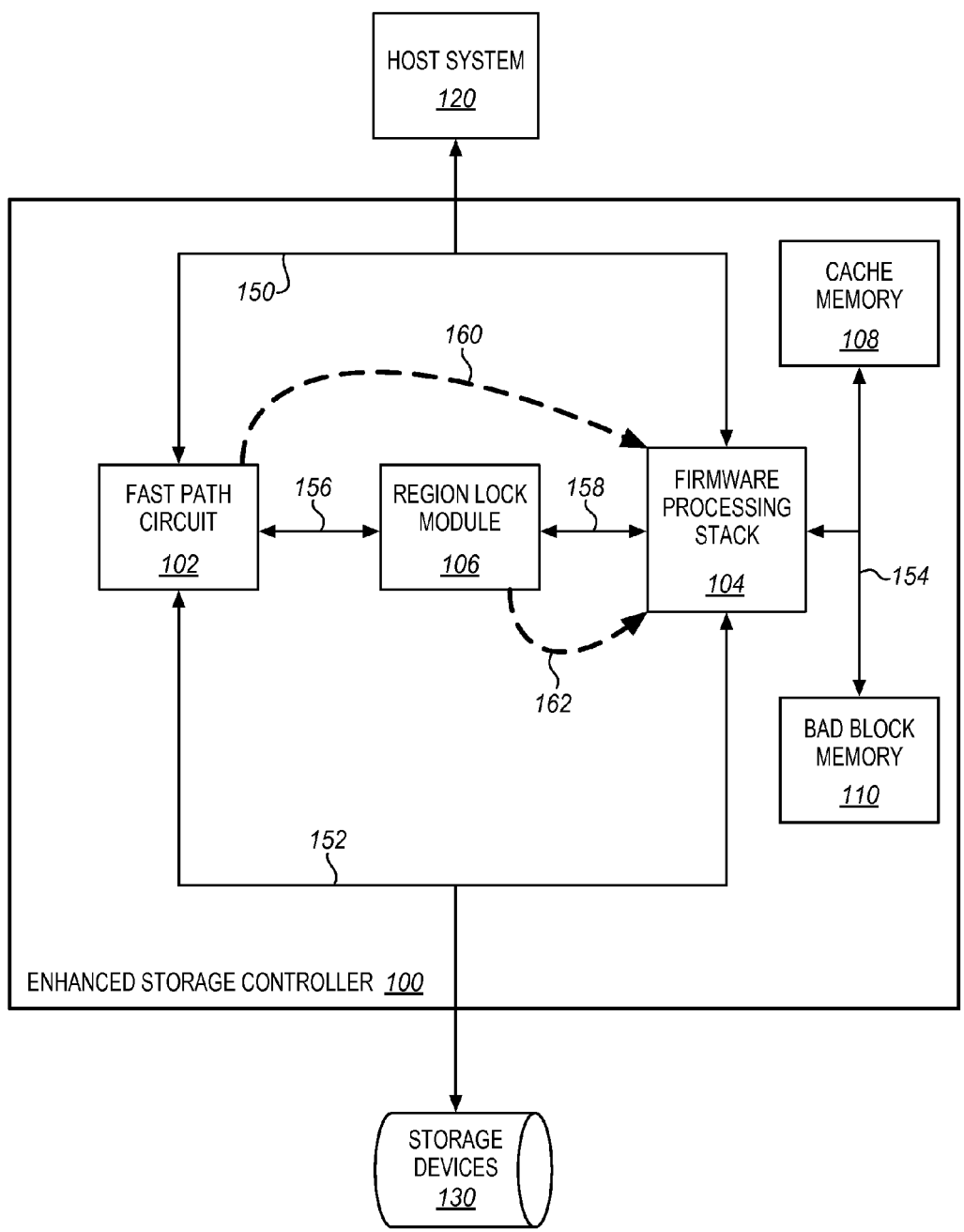
FIG. 1 is a block diagram of an exemplary storage controller enhanced in accordance with features and aspects hereof to provide for management of divert-type region locks to divert processing of I/O requests from one processing stack of the controller to another.
Figure 2:
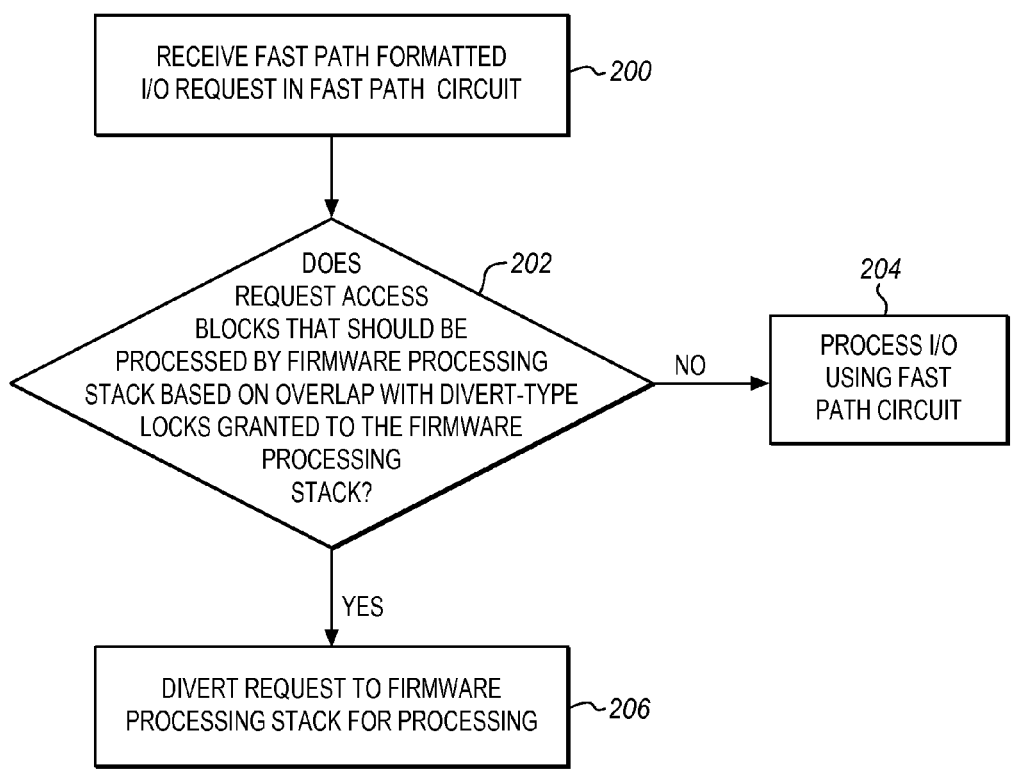
FIGS. 2 through 8 are flowcharts describing exemplary methods in accordance with features and aspects hereof to provide for management of divert-type region locks to divert processing of I/O requests from one processing stack of the controller to another.

FIG. 1 is a block diagram of a system comprising an enhanced storage controller 100 adapted to couple with one or more host systems 120 and with one or more storage devices 130. Host system 120 may be any suitable computing device or other system that generates I/O requests to access storage devices 130. Storage devices 130 may be any suitable devices for storing data such as magnetic or optical disk drives, solid-state drives, etc. Storage controller 100 may be coupled with host system 120 by interface 150. Interface 150 may comprise any suitable communication medium and protocol for coupling storage controller 100 with host system 120 including, for example, Serial Attached SCSI (SAS), parallel SCSI, parallel Advanced Technology Attachment (PATA), Serial ATA (SATA), Peripheral Component Interconnect (PCI including variants of PCI such as PCI Express), etc. Storage controller 100 may be coupled with storage devices 130 via interface 152. Interface 152 may comprise any suitable communication medium and protocol for coupling storage controller 100 with storage devices 130 including, for example, parallel SCSI SAS, PATA, SATA, PCI, Fibre Channel, etc.

Storage controller 100 comprises fast path circuit 102 and firmware processing stack 104 both adapted to process received I/O requests from an attached host system by accessing storage devices 130. Both circuit 102 and stack 104 may be referred to as processing "stacks". Thus, controller 100 comprises multiple stacks for processing I/O requests. Further, any number of such processing stacks may be provided in an embodiment of controller 100 as a matter of design choice. Controller 100 is generally operable to divert an I/O request from one processing stack to another based on diversion information comprising region locks as discussed further herein below. Such diversions by region locks may be used to avoid potential corruption of data should one processing stack be incapable of correctly processing an I/O request. The diversion region locks may also be used, for example, to prefer one processing stack over another for purposes of performance enhancements and optimizations.

Firmware processing stack 104 comprises a general or special purpose processor (not shown) and associated program and data memory (not shown) storing programmed instructions and data for execution by the general or special purpose processor. The programmed instructions of firmware processing stack 104 enable stack 104 to receive I/O requests from host system 120 formatted in accordance with any suitable command structure and to process the received I/O request to access information on storage devices 130.

As noted above, although stack 104 provides the flexibility to process any and all I/O requests, including RAID storage management associated with I/O requests directed to a logical volume, stack 104 may be slower than desired for processing of certain types of I/O requests. Thus, storage controller 100 further comprises fast path circuit 102. Fast path circuit 102 comprises an electronic circuit specifically designed to handle I/O requests formatted for processing by the fast path circuit 102 received from an enhanced driver within the system 120. Some storage controllers from LSI Corporation exemplify the use of such a fast path circuit in combination with an enhanced driver module to improve the performance of storage controller 100 in accessing data. In general, an enhanced driver (not shown) of host system 120 has access to mapping information for RAID logical volumes managed by storage controller 100 similar to the mapping information maintained by controller 100 for RAID management. The enhanced driver of host 120 may selectively perform requisite logical to physical mapping more quickly and efficiently than storage controller 100 utilizing firmware processing stack 104. In such cases, the enhanced driver of host system 120 prepares a fast path formatted I/O request utilizing its own processing power for any required logical to physical mapping or other required logical volume management computations. The fast path formatted I/O request is then forwarded to storage controller 100 for processing by fast path circuit 102.

Firmware processing stack 104 is coupled with cache memory 108 and bad block memory 110 by any suitable processor or system bus 154. Each of cache memory 108 and bad block memory 110 may comprise any suitable memory components including, for example, dynamic random access memory (DRAM), flash memory, etc. As is generally known in the art, firmware processing stack 104 utilizes cache memory 108 to store data associated with write I/O requests destined to storage devices 130. In a write-through mode of managing cache memory 108, firmware processing stack 104 stores write data associated with a write I/O request in cache memory 108 and also (essentially simultaneously) stores the write data on storage devices 130. The data so stored in cache memory 108 may then be utilized by firmware processing stack 104 to more rapidly complete subsequent read requests requesting data from block addresses for which data is presently stored in cache memory when awake. In addition, firmware processing stack 104 may identify a particular block address or ranges of block addresses that may be potentially bad blocks. Any suitable techniques within firmware processing stack 104 may be utilized to identify blocks that may be considered "bad". Firmware processing stack 104 records such block addresses in bad block memory 110 so as to note the blocks for avoidance in its processing of I/O requests. These and other functions within controller 100 may benefit from the divert-type region lock features and aspects hereof. In any situation within controller 100 where requests directed to one request processing stack or circuit should be diverted to a different processing stack or circuit, the divert-type region lock features and aspects hereof provide for making such determination efficiently with minimal overhead processing.

Both fast path circuit 102 and firmware processing stack 104 interact with region lock module 106 of controller 100 (e.g., via communication paths 156 and 158, respectively). Region lock module 106 comprises any suitable circuit for receiving lock requests and region lock release requests from fast path circuit 102 and from firmware processing stack 104. Region lock requests generally identify a range of block addresses for which an I/O request processing stack requires access (i.e., temporary shared access for a read, exclusive access for some operations, etc.). For example, when fast path circuit 102 identifies a range of affected block addresses required for processing a received fast path formatted I/O request, it issues a lock request via path 156 to region lock module 106. Region lock module 106 maintains data structures in an associated region lock memory (not shown) identifying ranges of blocks that are presently locked to either of fast path circuit 102 or firmware processing stack 104. Responsive to a new lock request, region lock module 106 determines whether the range of block addresses identified by the new request overlaps any portion of the ranges of block addresses associated with a presently granted region lock. If such an overlap is detected, region lock module 106 denies the lock or delays granting the lock until such time as the range of block addresses for the new request does not overlap any portion of block addresses associated with a presently granted lock. In like manner, fast path processing circuit 102 and firmware processing stack 104 also issue lock release requests to region lock module 106 when their need for access is completed (i.e., when the associated I/O request has been processed). In some exemplary embodiments, region lock module 106 may also serve as an initial routing component to detect whether a received I/O request is formatted as a fast path I/O request or not so formatted. In such exemplary embodiments, module 106 may be directly coupled with host 120 (through an appropriate communication medium and protocol) while circuit 102 and stack 104 are then coupled directly with module 106 (and thus indirectly with host 120). These and other configuration and arrangements of the elements of controller 100 will be apparent to those of ordinary skill in the art as a matter of design choice.

In accordance with features and aspects hereof, firmware processing stack 104 may issue divert-type lock requests to region lock module 106 (via path 158). A divert-type lock request identifies a range of block addresses for which all I/O requests that may affect the identified a range of block addresses should be diverted to one or another of the multiple I/O request processing stacks (e.g., fast path circuit 102 or firmware processing stack 104) to avoid possible data corruption and/or to permit optimizations for performance enhancement. More specifically, for example, firmware processing stack 104 may manage use of cache memory 108 and bad block of memory 110. As noted above, when firmware processing stack 104 manages cache memory 108 in a write-back mode, write data associated with a received write I/O request may be stored in cache memory 108 and marked as "dirty data". When firmware processing stack 104 stores such dirty data in cache memory 108, it may also issue a divert-type lock request to region lock module 106 to identify the corresponding range of block addresses for which further I/O requests should be diverted to firmware processing stack 104. When fast path circuit 102 next attempts to lock a range of block addresses for a fast path formatted I/O request, region lock module 106 will detect the overlap of the granted divert-type lock and force diversion of the fast path formatted request to firmware processing stack 104 for further processing. Thus, fast path formatted I/O requests destined to the range of block addresses for which the firmware processing stack has already acquired a divert-type region lock, will be diverted away from fast path circuit 102 for processing by firmware processing stack 104. As noted above, region locks may be employed by firmware processing stack 104 for any number of reasons to divert fast path formatted I/O requests away from fast path circuit 102 for processing by firmware processing stack 104. Besides the avoidance of data corruption as noted above, diversion region locks may be utilized by firmware processing stack 104 to assure proper operation of various optimizations that may be available such as, coalescing of smaller operations into larger operations, load balancing among the I/O processing stacks, streaming I/O optimizations, etc.

Bolded dashed arrows 160 and 162 represent the diversion of a fast path formatted I/O request received by fast path circuit 102 for further processing by firmware processing stack 104. In some exemplary embodiments, region lock module 106 may perform the diversion (as indicated by dashed arrow 162) in response to fast path circuit 102 attempting to lock a range of block addresses before processing a fast path formatted I/O request. In other exemplary embodiments, fast path circuit 102 may request its access lock request for a range of block addresses to be accessed by a fast path formatted I/O request and receive a denial signal from region lock module 106 indicating that the affected range of block addresses should be diverted to firmware processing stack 104 for further processing. In such an exemplary embodiment, fast path circuit 102 may itself perform the processing to divert the fast path formatted I/O request to firmware processing stack 104 as indicated by dashed arrow 160.

In some exemplary embodiments, region lock module 106 maintains information regarding presently granted locks (access locks as well as divert-type locks) in a tree structure to permit rapid searching to locate potential overlapping lock requests. The tree structure entries are organized by ranges of block addresses to allow for rapid searching by region lock module 106. The tree structure may be maintained by suitably designed custom circuitry within region lock module 106 or, in other exemplary embodiments, may be provided by additional custom circuit logic associated with the circuitry of region lock module 106. The Related Patents noted above provide exemplary details for implementation of such a tree structure and for custom circuits adapted to manage such a tree structure. It will be understood that such a tree structure represents one possible embodiment. Numerous other data structures and corresponding control log may be employed to record and retrieve information regarding the locks. For example, a hash table structure may be employed for these purposes.

Exemplary additional details of methods of operation of storage controller 100 as regards the diversion of fast path formatted I/O requests and the associated management of divert-type region locks are discussed herein below with respect to other figures. Those of ordinary skill in the art will readily recognize that divert-type region lock features and aspects hereof may be applicable in any storage controller architecture having at least two processing stacks/processors (e.g., such as LSI Corporation's fast path circuit in conjunction with its firmware/conventional processing stack). Features and aspects hereof may beneficially apply to any such storage controller architecture where a rapid decision is desired to divert a request from one processing stack (to which a request is nominally directed) to another processing stack of the controller. Further, those of ordinary skill in the art will readily recognize numerous additional and equivalent elements that may be present in a fully functional storage controller. Such additional and equivalent elements are omitted herein for simplicity and brevity of this discussion FIGS. 2 through 8 are flowcharts describing exemplary methods for managing the diversion of fast path formatted I/O requests from a fast path processing circuit to a firmware processing stack of a storage controller in accordance with features and aspects hereof. The methods of FIGS. 2 through 8 are generally operable in an enhanced storage controller such as storage controller 100 of FIG. 1. At step 200, the enhanced storage controller receives a fast path formatted I/O request. Such a request may be received directly by the fast path circuit of the enhanced storage controller or may be initially received by a selection module of the controller operable to determine whether the received I/O request is formatted as a fast path I/O request and, if so, forwards the request to the fast path circuit. At step 202, the enhanced storage controller determines whether the fast path formatted I/O request is attempting to access any block addresses that should be processed by the firmware processing stack based on the present status of granted locks—in particular based on divert-type locks as discussed further herein below. In general, the fast path circuit will apply a lock request signal to the region lock module of the enhanced storage controller requesting access to the range of block addresses identified in the received, fast path formatted I/O request. The region lock module then makes the determination indicated by step 202 as to whether the identified range of block addresses overlaps with the range of block addresses associated with any presently granted lock. In particular, the region lock module will determine whether the requested range of block addresses overlaps any divert-type lock previously granted by the region lock module. If no such overlap of block addresses is identified, step 204 continues normal processing of the fast path circuit to access the identified range of block addresses in accordance with the fast path formatted I/O request (and then releases the access lock granted by the region lock module). Alternatively, if the region lock module determines that the range of block addresses to be accessed by the fast path formatted I/O request overlaps any portion of the range of block addresses in a previously granted divert-type lock request, step 206 is next operable to divert the fast path formatted I/O request to the firmware processing stack for completion of the I/O request. By so diverting the fast path formatted I/O request to the firmware processing stack of the enhanced storage controller, data corruption may be avoided and firmware processing stack optimizations may be advantageously utilized without completely disabling the fast path circuit of the enhanced storage controller (as is presently practiced). Thus, desired performance levels of the enhanced storage controller may be maintained for fast path formatted I/O requests that can be processed by the fast path circuit while requests that should be diverted to the firmware processing stack may be quickly identified as such.

Figure 3:
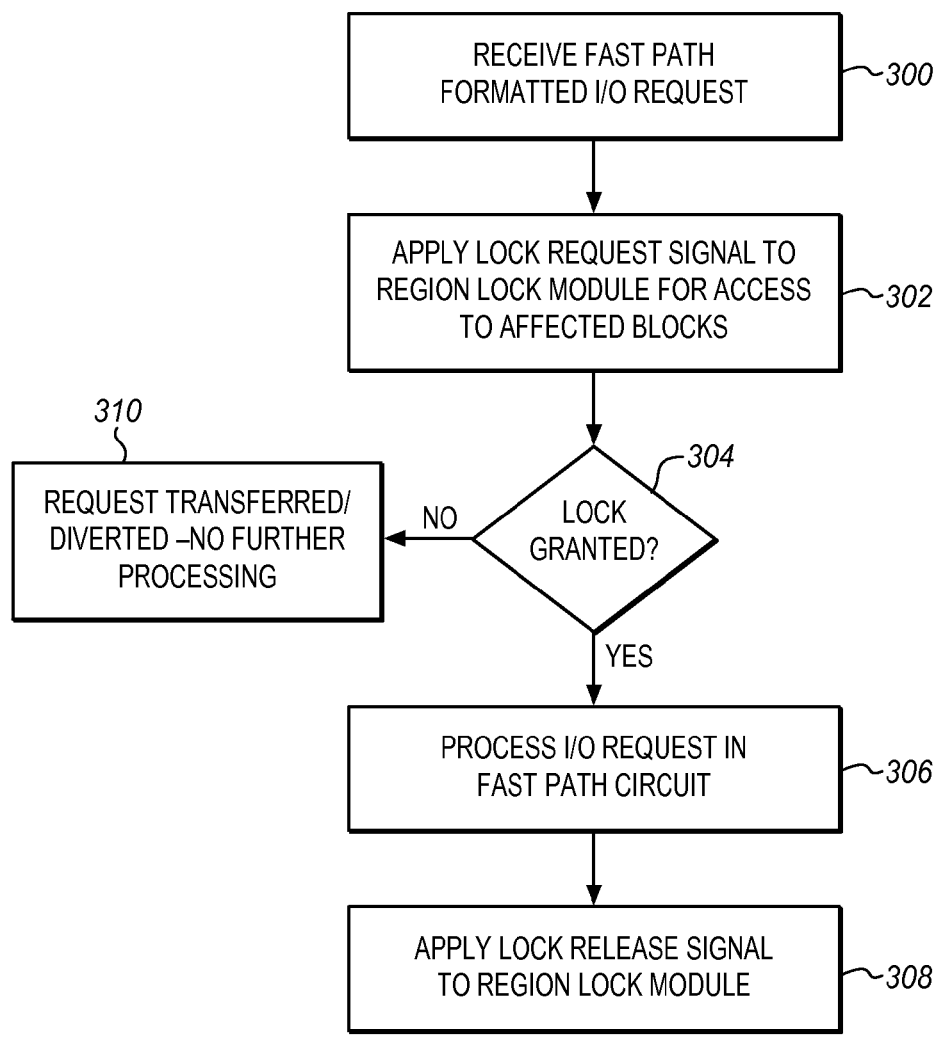

FIG. 3 is a flowchart describing exemplary additional details of a method in accordance with features and aspects thereof to divert fast path formatted I/O requests from the fast path circuit to a firmware processing stack of the enhanced storage controller by use of region locks. The method of FIG. 3 reflects processing by the fast path circuit of the enhanced storage controller operable in conjunction with a region lock module of the enhanced storage controller. At step 300, a fast path formatted I/O request is received from a host system (i.e., either received directly from the host or received indirectly through a preliminary selection component of the enhanced storage controller). Step 302 then applies a lock request signal to the region lock module requesting access to a range of block addresses identified for access by the fast path formatted I/O request. The range of block addresses is identified by information within the received fast path formatted I/O request. The signal so applied to the region lock module may therefore indicate both the request for an access lock as well as the range of block addresses affected by the I/O request. In some exemplary embodiments, the signal so applied to the region lock module may further comprise sufficient context information to provide the region lock module with all information it may require to divert the request to the firmware processing stack of enhanced storage controller. At step 304, the fast path circuit determines whether its requested lock has been granted. In some exemplary embodiments, the region lock module may return a signal to the fast path circuit indicating that the requested lock has been granted or denied. If the requested lock has been granted, steps 306 and 308 are operable to complete processing of the fast path formatted I/O request by operation of the fast path circuit (step 306) and then to release the granted, access lock by applying an appropriate release signal to the region lock module (step 310). In some embodiments, if the requested lock is denied because the requested range of blocks to be locked overlaps a divert-type lock acquired by the firmware processing stack, the region lock module perform all processing necessary to divert the I/O request to the firmware processing stack based on the context information provided in the lock request signal applied at step 302. In such embodiments, the fast path circuit need not perform any further processing but merely awaits receipt of a next fast path formatted I/O request. In other exemplary embodiments, the region lock module returns a signal to the fast path circuit indicating denial of its region lock request and further indicating that the denial is due to a previously granted to divert-type region lock request. In such exemplary embodiments, step 312 is next operable to transfer or divert the fast path formatted I/O request to the firmware processing stack (e.g., the I/O request is diverted to the firmware processing stack by operation of the fast path circuit rather than by the region lock module per se).

Figure 4:
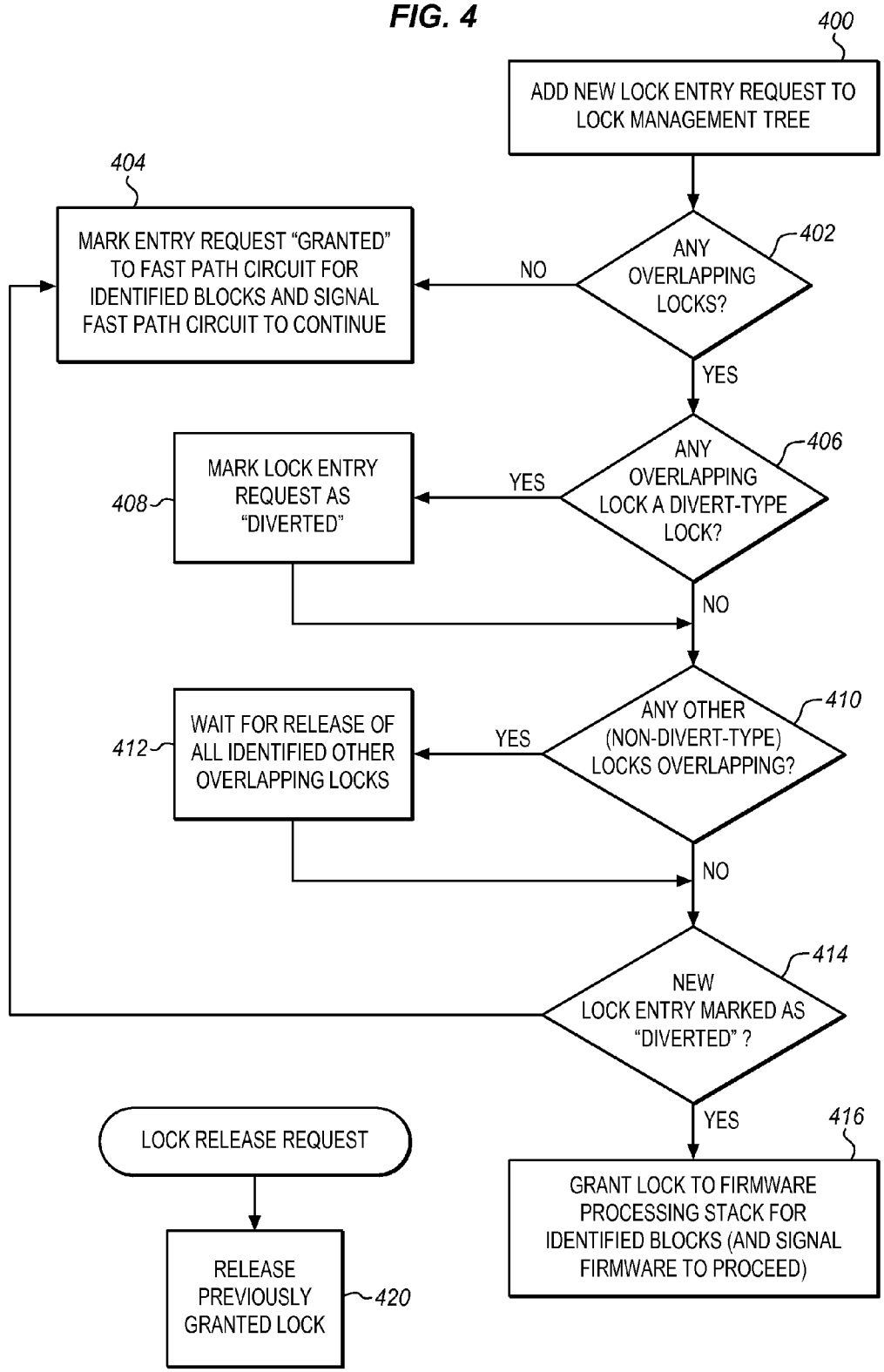

FIG. 4 is a flowchart providing exemplary additional details of the processing of a region lock module within an enhanced storage controller (e.g., region lock module 106 of storage controller 100 of FIG. 1). Processing of FIG. 4 describes principally the processing of the region lock module responsive to a lock request signal received from the fast path circuit of the enhanced storage controller. Similar processing may be performed in response to receipt of an access lock request received from the firmware processing stack. Such similar processing will be readily apparent to those of ordinary skill in the art and is thus omitted herein for simplicity and brevity of this discussion. Responsive to receipt of an access lock request from the fast path circuit, step 400 adds a new entry to its tree structure of locks (added in an appropriate place as determined by the ranges of block addresses associated with each entry). Step 402 next determines whether the range of block addresses identified in the lock request overlaps any portion of the range of block addresses associated with a previously granted lock request (i.e., a previously granted lock request of any type including an access lock or a divert-type lock). If not, step 404 marks the new lock entry as granted to the fast path circuit for the identified range of block addresses and signals the fast path circuit to continue its operation to execute the I/O operation. If step 402 determines that the requested range of block addresses to be locked overlaps the range of block addresses associated with one or more previously granted lock requests, step 406 determines whether any of the overlapping previously granted locks is a divert-type lock. If so, step 408 marks the newly added lock entry as a diverted lock for an I/O request that has now been (soon will be) diverted to the firmware processing stack.

Following step 408 or if step 406 determines that the new lock request does not overlap a granted divert-type lock, processing continues at step 410 to determine whether any other (e.g., non-divert-type such as an access lock) may overlap the range of block addresses of the received lock request from the fast path circuit. If so, step 412 waits for all such other previously granted locks to be released.

Following step 412 or if step 410 determines that no other such locks are overlapped, processing continues at step 414 to determine whether the newly added entry in the lock tree has been marked as now diverted. If not, step 404 marks the lock entry has now granted to the fast path circuit for the identified range of blocks and signals the fast path circuit of the grant thus allowing the fast path circuit to continue its processing of the fast path formatted I/O request.

Step 414 determines that the new lock entry has been marked as now diverted and step 416 marks the newly added lock entry as granted to the firmware processing stack for the identified range of block addresses. The fast path formatted I/O request is thus diverted to the firmware processing stack for eventual processing in due course. No further processing of the request is performed by the fast path circuit. In other exemplary embodiments, as noted above, the region lock module may simply signal the fast path circuit that its lock request has been denied and should be diverted to the firmware processing stack thus allowing the fast path circuit, per se, to perform the processing to divert the request to the fast firmware processing stack.

Also depicted in the method of FIG. 4 is the method processing step for releasing a previously granted lock request. When an I/O request processing stack (e.g., the fast path circuit or the firmware processing stack) has completed its processing of an I/O request for which it get obtained a granted lock, step 420 releases the previously granted lock in response to an appropriate release signal received from the processing stack.

Figure 5:
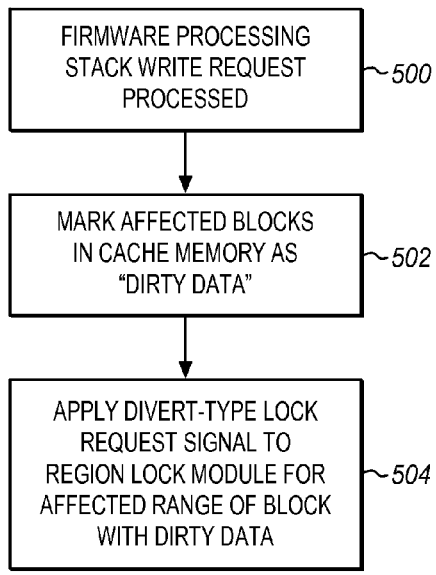
Figure 6:
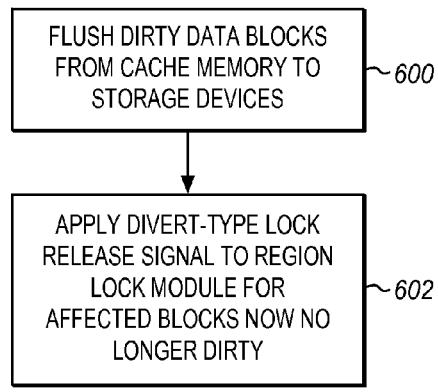
Figure 7:
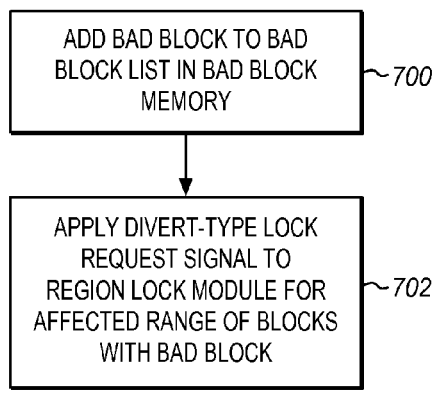

FIGS. 5, 6, and 7 depict exemplary additional details of processing within the firmware processing stack of the enhanced storage controller (e.g., firmware processing stack 104 of storage controller 100 of FIG. 1) to request divert-type region locks and to release previously granted the divert-type region locks responsive to particular processing within the firmware processing stack. As noted above, when the firmware processing stack processes a write request utilizing its cache memory in a write-back mode, it requests a divert-type region lock be granted for the range of block addresses for which dirty data resides in the cache memory (i.e., dirty data that has not yet been flushed or posted to the storage devices). FIG. 5 describes exemplary additional details of the processing of firmware processing stack to request such a divert-type lock responsive to storing dirty data in its cache memory. At step 500 the firmware processing stack processes a write I/O request by storing data in its cache memory in a write-back mode. At step 502, the firmware processing stack marks in the affected blocks in cache memory as "dirty data" signifying that the cache memory contains data corresponding to block addresses not yet posted or flushed to the storage devices. At step 504, the firmware processing stack applies a divert-type lock request signal to the region lock module identifying the range of block addresses for which dirty data has been stored in the cache memory.

FIG. 6 describes further processing of the firmware processing stack to release a divert-type lock previously granted when the dirty data is successfully flushed or posted to storage devices. At step 600, the firmware processing stack performs appropriate processing to flush or post dirty data blocks from the cache memory to the storage devices for persistent storage. Step 602 then applies a divert-type lock release signal to the region lock module identifying a range of block addresses that are no longer associated with "dirty data" in the cache memory. The region lock module may then release the previously granted divert-type lock.

FIG. 7 is a flowchart describing exemplary additional details of processing of the firmware processing stack to request a divert-type lock be granted for a range of block addresses that may represent bad blocks. As noted above, the firmware processing stack may designate a block as "bad" in response to any of various types of errors encountered in the utilizing a particular block or range of block addresses. At step 700, the firmware processing stack adds one or more block addresses to its bad block list stored in a bad block memory associated with the firmware processing stack. At step 702, the firmware processing stack applies a divert-type lock request signal to the region lock module requesting a divert-type region lock be granted for an identified range of block addresses that are identified as "bad" blocks by processing of the firmware processing stack.

Figure 8:
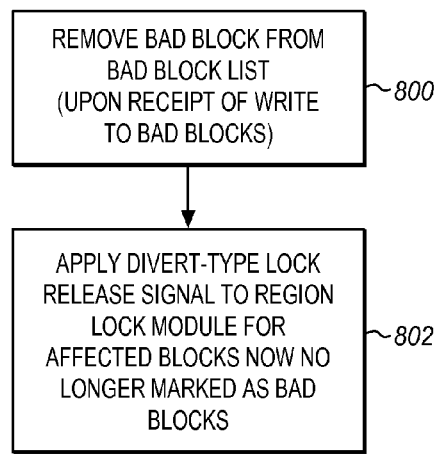

FIG. 8 describes further processing of the firmware processing stack to release a divert-type lock previously granted when a block previously marked as bad (a range of blocks marked bad with a corresponding divert-type lock) have been successfully updated (e.g., upon a successful write to the previously marked bad blocks). At step 800, the firmware processing stack performs appropriate processing to remove one or more blocks from the bad block list (e.g., in association with completing a successful write operation to the bad block/blocks). Step 802 then applies a divert-type lock release signal to the region lock module identifying a range of block addresses that are no longer associated with bad blocks in the updated bad block list. The region lock module may then release the previously granted divert-type lock.

Those of ordinary skill in the art will readily recognize numerous additional and equivalent steps that may be present in fully functional methods such as the methods described with respect to FIGS. 2 through 8. Such additional and equivalent steps are omitted herein for simplicity and brevity of this discussion.

Figure 9:
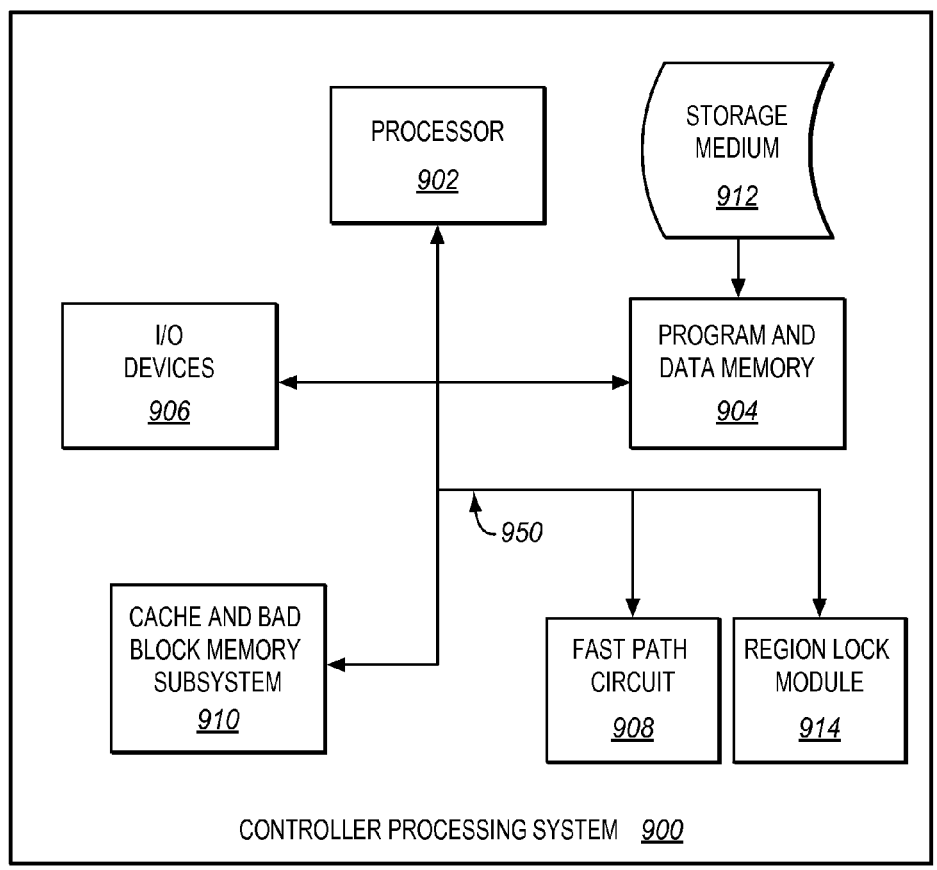
FIG. 9 is a block diagram of an exemplary computing device of a storage controller such as that of FIG. 1 adapted to receive a computer readable medium embodying the methods of FIGS. 2 through 8.

Embodiments disclosed herein can take the form of software, hardware, firmware, or various combinations thereof. In one particular embodiment, software is used to direct a processing system of a storage device (e.g., a storage controller) to perform the various operations disclosed herein. FIG. 9 illustrates a processing system 900, such as firmware processing stack 104 within storage controller 100 of FIG. 1, operable to execute programmed instructions stored in a computer readable medium to perform desired functions in an exemplary embodiment. Processing system 900 is operable to perform the above operations by executing programmed instructions tangibly embodied on computer readable storage medium 912. In this regard, embodiments of the invention can take the form of a computer program accessible via computer-readable medium 912 providing program code for use by a computer or any other instruction execution system.

For the purposes of this description, computer readable storage medium 912 can be anything that can contain or store the program for use by the computer. Computer readable storage medium 912 can be an electronic, magnetic, optical, electromagnetic, infrared, or semiconductor device. Examples of computer readable storage medium 912 include a solid state memory (e.g., a flash memory), a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 900, being suitable for storing and/or executing the program code, includes at least one processor 902 coupled to program and data memory 904 and to cache memory subsystem 908 through a system bus 950. Program and data memory 904 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 906 may further be included (e.g., devices for coupling with the storage devices and host systems. Fast path circuit 908 and region lock module 914 may also be integrated with the system to enable processing system 900 to rapidly process fast path formatted I/O requests and to coordinate locking of block addresses as discussed herein above.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A storage controller adapted to couple with one or more host systems and adapted to manage data on one or more storage devices coupled with the storage controller, the storage controller comprising:

a fast path circuit adapted to process an I/O request formatted for fast path processing received from an attached host system;

a firmware processing stack operating on a processor of the controller, the firmware processing stack adapted to process any format of I/O request; and a region lock module coupled with the fast path circuit and coupled with the firmware processing stack, the region lock module adapted to process lock request signals from the fast path circuit to lock a specified range of block addresses in a cache memory of the storage controller, the region lock module further adapted to determine whether a received fast path formatted I/O request should be diverted to the firmware processing stack based on the status of presently locked ranges of block addresses, wherein the storage controller is adapted to divert the fast path formatted I/O request to the firmware processing stack for processing in response to determining that processing of the fast path formatted I/O should be diverted to the firmware processing stack, wherein the firmware processing stack is adapted to apply a lock request to the region lock module to establish a divert-type region lock for a range of block addresses in response to determining that a fast path formatted I/O request attempting to access blocks in the range of block addresses should be processed by the firmware processing stack, wherein the region lock module is further adapted to establish the divert-type region lock for a range of block addresses responsive to receipt of the lock request from the firmware processing stack, and wherein the controller is further adapted to divert a received fast path formatted I/O request to the firmware processing stack in response to detecting that the divert-type region lock has been established for a range of block addresses that would be affected by fast path circuit processing of the fast path formatted I/O request.

2. The controller of claim 1 wherein:

the cache memory is adapted to store write data for block addresses affected by processing of a write I/O request by the firmware processing stack, wherein the firmware processing stack is further adapted to apply the divert-type region lock request to the region lock module for a range of block addresses in response to storing data in the cache memory that relates to block addresses within the range of block addresses.

3. The controller of claim 2 wherein the firmware processing stack manages the cache memory as a write-back cache memory.

4. The controller of claim 1 further comprising:

a bad block memory coupled with the firmware processing stack, the bad block memory adapted to store bad block information identifying block addresses of potentially bad blocks of the storage devices, wherein the firmware processing stack is further adapted to apply the divert-type region lock request to the region lock module for a range of block addresses in response to storing an entry in the bad block memory identifying a block address within the range of block addresses.

5. The controller of claim 1 wherein the fast path circuit applies context information regarding the fast path formatted I/O request to the region lock module, and wherein the region lock module is further adapted to divert the fast path formatted I/O request to the firmware processing stack for processing in accordance with the context information.

6. The controller of claim 1 wherein the fast path circuit is further adapted to divert the fast path formatted I/O request to the firmware processing stack for processing in response to a signal from the region lock module indicating that processing of the fast path formatted I/O should be diverted to the firmware processing stack.

7. A method operable in a storage controller adapted to couple with one or more host systems and adapted to couple with one or more storage devices, the storage controller having a fast path circuit for processing of fast path formatted I/O requests received from a host system and having a firmware processing stack for processing I/O requests of any format, the method comprising:

receiving a lock request from the fast path circuit to lock a range of block addresses in a cache memory of the storage controller;

receiving a fast path formatted I/O request;

determining, by operation of a region lock module of the controller, whether the received fast path formatted I/O should be diverted to the firmware processing stack based on a status of presently locked ranges of block addresses in the cache memory;

diverting the fast path formatted I/O request to the firmware processing stack for processing in response to the determination that the fast path formatted I/O request should be diverted to the firmware processing stack for processing;

applying, responsive to receipt of the fast path formatted I/O request, a fast path lock request signal from the fast path circuit to the region lock module wherein the fast path lock request comprises information regarding the fast path formatted I/O request, wherein the step of determining comprises:

determining, by operation of a region lock module, whether the received fast path formatted I/O request is directed to a block address within a locked range of block addresses based on the information provided with the fast path lock request signal;

identifying, by operation of the firmware processing stack, a range of block addresses for which a fast path formatted I/O request attempting to access the range should be diverted to the firmware processing stack;

applying a divert-type lock request signal from the firmware processing stack to the region lock module requesting establishment of a divert-type lock for the identified range of block addresses; and establishing, by operation of the region lock module, the divert-type lock for the range of block addresses identified in the divert-type lock request signal in response to receipt of the divert-type lock request signal, wherein the step of determining further comprises:

determining whether the received fast path formatted I/O request is directed to a block address within the range of block addresses associated with the established divert-type lock such that processing of the fast path formatted I/O request should be diverted to the firmware processing stack based on the status of presently locked ranges of block addresses.

8. The method of claim 7 wherein the firmware processing stack manages the cache memory as a write-back cache, the method further comprising:

storing, by operation of the firmware processing stack, write data in the cache memory in response to processing of a write I/O request by the firmware processing stack, wherein the step of identifying further comprises:

identifying the range of block addresses that includes a block address associated with the write data stored in cache memory.

9. The method of claim 7 wherein the controller has a bad block memory coupled with the firmware processing, the method further comprising:

storing, by operation of the firmware processing stack, information in the bad block memory identifying block addresses of potentially bad blocks on the storage devices, wherein the step of identifying further comprises:

identifying the range of block addresses that includes a block address of a potentially bad block in the bad block memory.

10. A non-transitory computer readable medium tangibly embodying programmed instruction which, when executed by a computer, perform a method operable in a storage controller, the storage controller adapted to couple with one or more host systems and adapted to couple with one or more storage devices, the storage controller having a fast path circuit for processing of fast path formatted I/O requests received from a host system and having a firmware processing stack for processing I/O requests of any format, the method comprising:
  receiving a lock request from the fast path circuit to lock a range of block addresses in a cache memory of the storage controller;
  receiving a fast path formatted I/O request;
  determining, by operation of a region lock module of the controller, whether the received fast path formatted I/O should be diverted to the firmware processing stack based on the status of presently locked ranges of block addresses in the cache memory;
  diverting the fast path formatted I/O request to the firmware processing stack for processing in response to the determination that processing of the fast path formatted I/O request should be diverted to the firmware processing stack;
  applying, responsive to receipt of the fast path formatted I/O request, a fast path lock request signal from the fast path circuit to the region lock module wherein the fast path lock request comprises information regarding the fast path formatted I/O request,
  wherein the step of determining comprises:
  determining, by operation of a region lock module, whether the received fast path formatted I/O request is directed to a block address within a locked range of block addresses based on the information provided with the fast path lock request signal;
  identifying, by operation of the firmware processing stack, a range of block addresses for which a fast path formatted I/O request attempting to access the range should be diverted to the firmware processing stack;
  applying a divert-type lock request signal from the firmware processing stack to the region lock module requesting establishment of a divert-type lock for the identified range of block addresses; and
  establishing, by operation of the region lock module, the divert-type lock for the range of block addresses identified in the divert-type lock request signal in response to receipt of the divert-type lock request signal,
  wherein the step of determining further comprises:
  determining whether the received fast path formatted I/O request is directed to a block address within the range of block addresses associated with the established divert-type lock such that processing of the fast path formatted I/O request should be diverted to the firmware processing stack based on the status of presently locked ranges of block addresses.

11. The medium of claim 10
  wherein the firmware processing stack manages the cache memory as a write-back cache,
  the method further comprising:
  storing, by operation of the firmware processing stack, write data in the cache memory in response to processing of a write I/O request by the firmware processing stack,
  wherein the step of identifying further comprises:
  identifying the range of block addresses that includes a block address associated with the write data stored in cache memory.

12. The medium of claim 10
  wherein the controller has a bad block memory coupled with the firmware processing,
  the method further comprising:
  storing, by operation of the firmware processing stack, information in the bad block memory identifying block addresses of potentially bad blocks on the storage devices,
  wherein the step of identifying further comprises:
  identifying the range of block addresses that includes a block address of a potentially bad block in the bad block memory.

13. A storage controller operable to process Input/Output (I/O) requests from a host system to a plurality of storage devices, the storage controller comprising:
  a cache memory operable to cache the I/O requests;
  a firmware processing stack operable to process the I/O requests;
  a fast path circuit operable to select a portion of the I/O requests for fast path processing based on a format of the I/O requests; and
  a region lock module coupled to the fast path circuit and to the firmware processing stack,
  wherein the region lock module is operable to process a lock request from the fast path circuit to lock a specified range of block addresses in the cache memory, to divert the portion of the I/O requests for fast path processing to the firmware processing stack based on the lock request,
  wherein the firmware processing stack processes the portion of the I/O requests to the storage devices on behalf of the fast path circuit in response to the portion of the I/O requests being diverted to the firmware processing stack,
  wherein the firmware processing stack is adapted to apply a lock request to the region lock module to establish a divert-type region lock for a range of block addresses in response to determining that a fast path formatted I/O request attempting to access blocks in the range of block addresses should be processed by the firmware processing stack,
  wherein the region lock module is further adapted to establish the divert-type region lock for a range of block addresses responsive to receipt of the lock request from the firmware processing stack, and
  wherein the storage controller is further adapted to divert a received fast path formatted I/O request to the firmware processing stack in response to detecting that the divert-type region lock has been established for a range of block addresses that would be affected by fast path circuit processing of the fast path formatted I/O request.

* * * * *